United States Patent
Jeong et al.

(10) Patent No.: US 11,221,965 B2
(45) Date of Patent: Jan. 11, 2022

(54) CACHE MEMORY, MEMORY SYSTEM INCLUDING THE SAME, AND EVICTION METHOD OF CACHE MEMORY

(71) Applicant: SK hynix Inc., Gyeonggi-do (KR)

(72) Inventors: Seung-Gyu Jeong, Gyeonggi-do (KR);
Dong-Gun Kim, Gyeonggi-do (KR);
Jung-Hyun Kwon, Seoul (KR);
Young-Suk Moon, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/287,778

(22) Filed: Feb. 27, 2019

(65) Prior Publication Data

US 2020/0026664 A1    Jan. 23, 2020

(30) Foreign Application Priority Data

Jul. 17, 2018 (KR) .......................... 10-2018-0082829

(51) Int. Cl.
*G06F 12/123* (2016.01)
*G06F 12/0868* (2016.01)
*G06F 12/127* (2016.01)

(52) U.S. Cl.
CPC ........ *G06F 12/123* (2013.01); *G06F 12/0868* (2013.01); *G06F 12/127* (2013.01)

(58) Field of Classification Search
CPC ................... G06F 12/12–128; G06F 12/00–16
See application file for complete search history.

(56) References Cited

U.S. PATENT DOCUMENTS

| | | | |
|---|---|---|---|
| 9,336,156 B2 | 5/2016 | Zhang et al. | |
| 2003/0135696 A1* | 7/2003 | Rankin | G06F 12/0831 711/136 |
| 2008/0010413 A1* | 1/2008 | Kailas | G06F 9/3824 711/129 |
| 2015/0052310 A1* | 2/2015 | Kim | G06F 12/0864 711/128 |
| 2015/0169458 A1* | 6/2015 | Purkayastha | G06F 12/0811 711/122 |
| 2018/0293175 A1* | 10/2018 | Chang | G06F 12/121 |

FOREIGN PATENT DOCUMENTS

KR     10-1791508     10/2017

* cited by examiner

*Primary Examiner* — Nicholas J Simonetti
(74) *Attorney, Agent, or Firm* — IP & T Group LLP

(57) ABSTRACT

In a cache memory used for communication between a host and a memory, the cache memory may include a plurality of cache sets, each comprising: a valid bit; N dirty bits; a tag; and N data sets respectively corresponding to the N dirty bits and each including data of a data chunk size substantially identical to a data chunk size of the host, wherein a data chunk size of the memory is N times as large as the data chunk size of the host, where N is an integer greater than or equal to 2.

11 Claims, 7 Drawing Sheets

| INDEX 0 | CACHE SET0 |
| | CACHE SET1 |
| | CACHE SET2 |
| | CACHE SET3 |
| INDEX 1 | CACHE SET4 |
| | CACHE SET5 |
| | CACHE SET6 |
| | CACHE SET7 |
| INDEX 2 | CACHE SET8 |
| | CACHE SET9 |
| | CACHE SET10 |
| | CACHE SET11 |
| ⋮ | ⋮ |
| INDEX 62 | CACHE SET248 |
| | CACHE SET249 |
| | CACHE SET250 |
| | CACHE SET251 |
| INDEX 63 | CACHE SET252 |
| | CACHE SET253 |
| | CACHE SET254 |
| | CACHE SET255 |

|  | V | D0 | D1 | D2 | D3 | OPERATION REQUIRED FOR EVICTION |
|---|---|---|---|---|---|---|
| CASE1 | 1 | 0 | 0 | 0 | 0 | NO |
| CASE2 | 1 | 1 | 0 | 1 | 0 | WRITE OPERATION |
| CASE3 | 0 | 1 | 1 | 1 | 1 | WRITE OPERATION |
| CASE4 | 0 | 0 | 0 | 1 | 0 | READ OPERATION AND WRITE OPERATION |

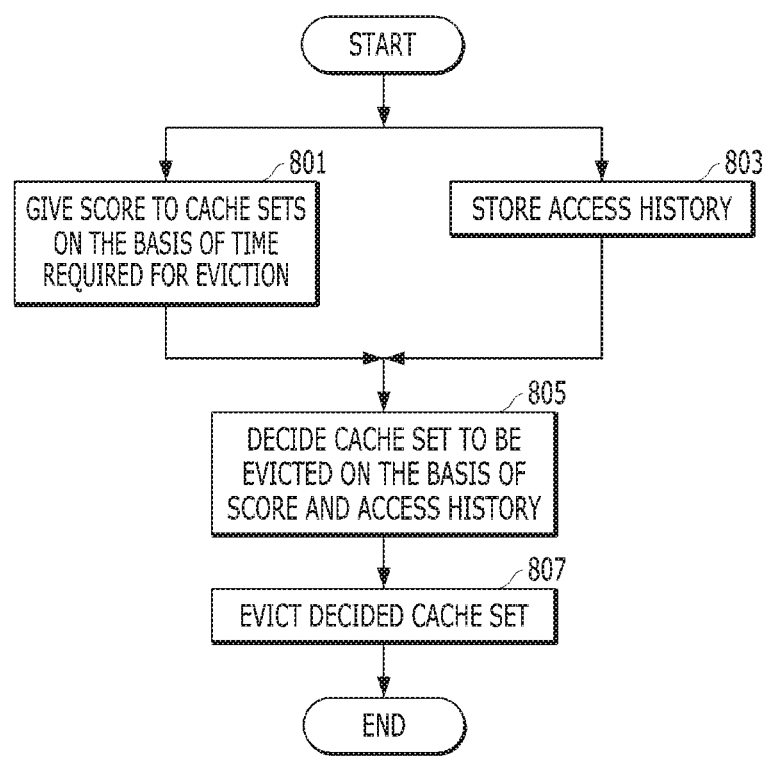

CACHE MEMORY, MEMORY SYSTEM INCLUDING THE SAME, AND EVICTION METHOD OF CACHE MEMORY

CROSS-REFERENCE TO RELATED APPLICATION

This application claims priority under 35 U.S.C. § 119 to Korean Patent Application No. 10-2018-0082829, filed on Jul. 17, 2018, which is incorporated herein by reference in its entirety.

BACKGROUND

1. Field

Various embodiments relate to a memory system including a cache memory.

2. Discussion of the Related Art

Recently, research into next generation memories, such as a resistive random access memory (RRAM), a phase-change random access memory (PCRAM), a magnetic random access memory (MRAM), and a ferroelectric random access memory (FRAM), has been actively conducted. However, the operation speeds of the next generation memories are less than desired and their defect rate is higher than desired. Endurance of the next generation memories is also a concern. In particular, when the next generation memories are accessed several times, their lifespan is rapidly shortened. Therefore, it is necessary to provide a cache memory for assisting the operation speeds of the next generation memories and reducing the number of accesses.

Moreover, all types of memories, including next generation memories, may operate with various types of hosts, and a host chunk size may differ for different types of hosts. Therefore, when the data chunk size of a host is different from the data chunk size of a memory, it is necessary to provide a cache memory available for communication between the host and the memory to support the different chunk sizes.

SUMMARY

Various embodiments are directed to a cache memory structure available for communication between a host and a memory having chunk sizes different from each other.

In an embodiment, in a cache memory used for communication between a host and a memory, the cache memory may include a plurality of cache sets, each comprising: a valid bit; N dirty bits; a tag; and N data sets respectively corresponding to the N dirty bits and each including data of a data chunk size substantially identical to a data chunk size of the host, wherein a data chunk size of the memory is N times as large as the data chunk size of the host, where N is an integer greater than or equal to 2.

In an embodiment, in an eviction method of a cache memory used for communication between a host and a memory, the eviction method may include: giving a score to each of a plurality of cache sets on the basis of time required for evicting the corresponding cache set; and evicting a cache set determined from among the plurality of cache sets based the score given to each of the plurality of cache sets, wherein data chunk sizes of the host and the memory are different.

In an embodiment, a memory system may include: a memory configured to have a data chunk size N times as large as a data chunk size of a host, where N is an integer greater than or equal to 2; a cache memory configured for communication between the host and the memory and to include a plurality of cache sets; a hit/miss check circuit configured to check hit or miss of the cache memory; an eviction circuit configured to decide a cache set to be evicted among the plurality of cache sets and evict the decided cache set when an eviction operation of the cache memory is required; and an operation control circuit configured to control a read operation and a write operation of the memory, wherein each of the plurality of cache sets comprises: a valid bit; N dirty bits; a tag; and N data sets respectively corresponding to the N dirty bits and each including data of a data chunk size substantially identical to the data chunk size of the host.

In an embodiment, a memory system may include: a host suitable for interfacing data of a first chunk size; a memory suitable for interfacing data of a second chunk size that is N times as large as the first chunk size, where N is an integer greater than or equal to 2; and a cache memory suitable for interfacing data between the host and the memory, the cache memory including at least one cache set, wherein the at least one cache set comprises a plurality of data sets for storing data of the second chunk size, each for storing data of the first chunk size, and a set of dirty bits corresponding to the plurality of data sets respectively, each set of dirty bits indicating whether data of the corresponding data set is identical to data of the memory.

BRIEF DESCRIPTION OF THE DRAWINGS

FIG. 2 is a diagram illustrating a cache memory in accordance with an embodiment.

FIG. 8 is a flowchart illustrating an eviction operation of an eviction circuit in accordance with an embodiment.

DETAILED DESCRIPTION

Figure 1:
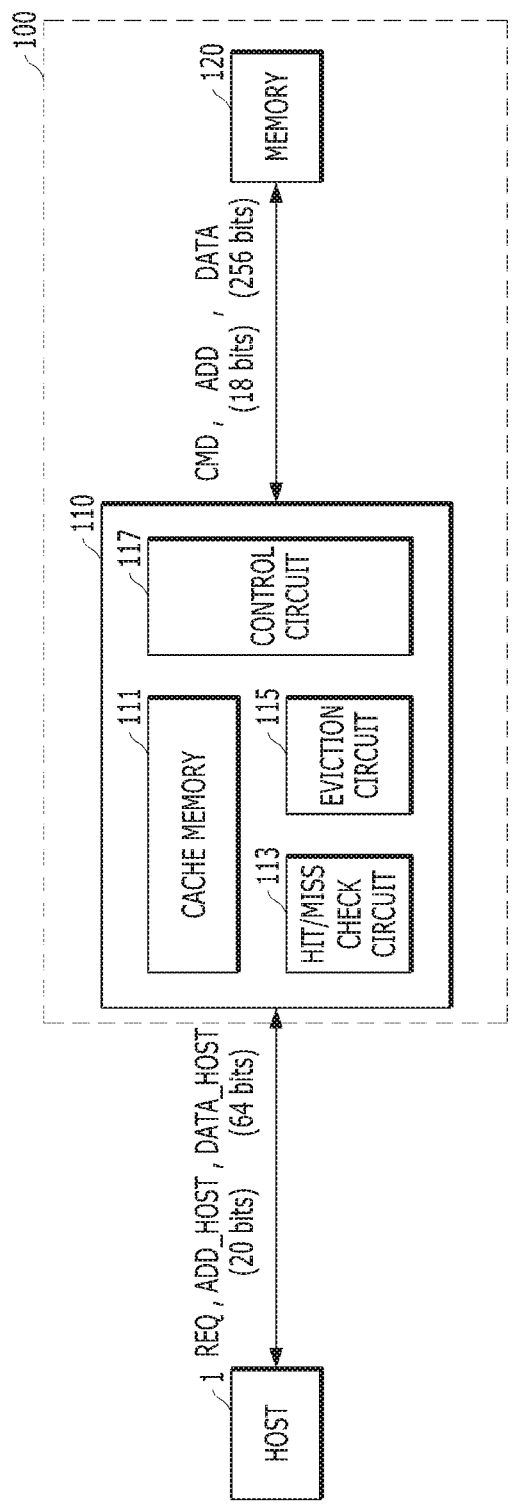
FIG. 1 is a diagram of a memory system in accordance with an embodiment.

Various embodiments will be described below in more detail with reference to the accompanying drawings. The present invention may, however, be embodied in different forms and should not be construed as limited to the embodiments set forth herein. Rather, these embodiments are provided so that this disclosure is thorough and complete and fully conveys the scope of the present invention to those skilled in the art. Throughout the disclosure, like reference numerals refer to like parts throughout the various figures and embodiments of the present invention. Also, throughout the specification, reference to "an embodiment" or the like is not necessarily to only one embodiment, and different references to any such phrase are not necessarily to the same embodiment(s).

Throughout the specification, when one element is referred to as being 'connected to' or 'coupled to' another element, it may indicate that the former element is directly connected or coupled to the latter element or electrically connected or coupled to the latter element with one or more other elements interposed therebetween. Furthermore, when it is stated that an element "includes" or "comprises" a component, such open ended transition term does not exclude the presence or addition of one or more other components but may further include or comprise such other component(s), unless the context indicates otherwise. Moreover, in some instances, a component described in the specification in the singular form may be implemented as multiple components.

FIG. 1 is a diagram illustrating a configuration of a memory system 100 in accordance with an embodiment.

Referring to FIG. 1, the memory system 100 may include a memory controller 110 and a memory 120. By way of example, a host 1 operating together with the memory system 100 is illustrated in FIG. 1.

The host 1 may transmit a request REQ to the memory controller 110 and request read and write operations of the memory 120. In requesting the read and write operations, the host 1 may transfer an address ADD_HOST for designating an area, at which the read and write operations are to be performed, to the memory controller 110. In requesting the write operation, the host 1 may transfer write data DATA_HOST to the memory controller 110. Further, after the request of the read operation, the host 1 may receive read data DATA_HOST from the memory controller 110. In order to distinguish an address ADD and data DATA transferred between the memory controller 110 and the memory 120, HOST is used. In other words, the address ADD_HOST and the data DATA_HOST indicate an address and data, respectively, which are transferred between the host 1 and the memory controller 110. In the present embodiment, the address ADD_HOST transferred between the host 1 and the memory controller 110 is 20 bits. Furthermore, a data chunk size of the host 1, that is, a size of the data DATA_HOST processed at a time in the read and write request of the host 1 is 64 bits. However, the present invention is not limited to these bit configurations.

The memory 120 may perform read and write operations under the control of the memory controller 110. The memory 120 may receive a command CMD and address ADD from the memory controller 110. Further, the memory 120 may transmit data DATA to, and receive data DATA from, the memory controller 110. The command CMD may be used in order to instruct an operation to be performed by the memory 120. The address ADD may be used to designate an area of the memory 120 to be accessed. Furthermore, in the write operation, data DATA may be transferred from the memory controller 110 to the memory 120. In the read operation, data DATA may be transferred from the memory 120 to the memory controller 110. The data chunk size of the memory 120 may be N times as large as that of the host 1 (where N is an integer greater than or equal to 2). In the present embodiment, N is 4, that is, the size of data DATA processed at a time in the read and write operations is 256 bits. Since the data chunk size of the memory 120 is four times as large as that of the host 1, the number of areas to be addressed may be reduced to ¼. Accordingly, the number of bits of the address ADD used in the memory 120 may be less than that of the address ADD_HOST of the host 1 by 2 bits. That is, the number of bits of the address ADD used in the memory 120 may be 18 bits. However, the present invention is not limited to this configuration.

The memory 120 may be any of various types of memories such as a dynamic random access memory (DRAM), a NAND flash, a resistive random access memory (RRAM), a phase-change random access memory (PCRAM), a magnetic random access memory (MRAM), and a ferroelectric random access memory (FRAM).

The memory controller 110 may control the memory 120 at the request of the host 1. The memory controller 110 may include a cache memory 111, a hit and miss (hit/miss) check circuit 113, an eviction circuit 115, and a control circuit 117.

The cache memory 111 may serve as a cache in communication between the host 1 and the memory 120. The cache memory 111 may operate at a speed faster than that of the memory 120 and may have a storage capacity less than that of the memory 120. Since the data chunk size (for example, 64 bits) of the host 1 and the data chunk size (for example, 256 bits) of the memory 120 are different, the cache memory 111 has a structure for supporting the difference. This will be described in detail with reference to FIG. 2 and FIG. 3.

The hit/miss check circuit 113 may check hit or miss of the cache memory 111 when the host 1 requests the read and write operation requests. In the case of the cache hit, since the memory 120 is not accessed and the cache memory 111 operating at a high speed is accessed, the read and write operation requests of the host 1 may be quickly processed. In the case of the cache miss, since the memory 120 should be accessed, the read and write operation requests of the host 1 may be slowly processed as compared with the cache hit.

The eviction circuit 115 may decide a cache set to be evicted and evict such cache set when there are no available cache set in the cache memory 111 and an eviction operation of the cache memory 111 is required.

The control circuit 117 may control the read and write operations of the memory 120.

FIG. 2 is a diagram illustrating an exemplary configuration of a cache memory, e.g., the cache memory 111 of FIG. 1, in accordance with an embodiment.

Referring to FIG. 2, the cache memory 111 may include a plurality of cache sets: CACHE SET0 to CACHE SET255. In the present embodiment, the number of the cache sets is 256, which may be classified into indexes 0 to 63. For example, four cache sets, CACHE SET4 to CACHE SET7, may correspond to the index 1 INDEX1.

The cache sets CACHE SET0 to CACHE SET255 may be addressed by some bits of the address ADD_HOST. Among 20 bits of the address ADD_HOST, 6 bits may be classified into an index. Cache sets having index values corresponding to addresses classified into the index may be accessed. For example, when a value of the index of the address ADD_HOST is 62, four cache sets CACHE SET248 to CACHE SET251 corresponding to the index 62 INDEX62 may be accessed.

As described above, a structure of a cache memory, in which the number of cache sets sharing one index value is 4, is called a 4-way set-associative structure. In such a case, when the index is removed, a fully-associative structure may be obtained. Although the cache memory 111 has the fully-associative structure, various embodiments to be described below may be applied to such structure.

Figure 3:
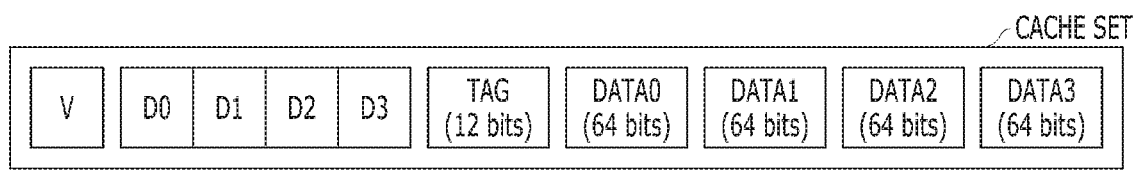
FIG. 3 is a diagram illustrating a cache set in accordance with an embodiment.

FIG. 3 is a diagram illustrating an exemplary configuration of a cache set CACHE SET in accordance with an embodiment. Each of the cache sets CACHE SET0 to CACHE SET255 of FIG. 2 may be configured as illustrated in FIG. 3.

Referring to FIG. 3, the cache set CACHE SET may include a valid bit V, N dirty bits D0 to D3, a tag TAG, and N data sets DATA0 to DATA3.

The valid bit V may indicate whether data has been updated to a corresponding cache set from the memory 120. When the valid bit V is activated to a logic high level, e.g., "1", it may indicate that the data has been updated to the corresponding cache set from the memory 120. When the valid bit V is deactivated to a logic low level, e.g., "0", it may indicate that the data has not been updated to the corresponding cache set from the memory 120.

The N dirty bits D0 to D3 may respectively indicate whether the N data sets DATA0 to DATA3 are dirty. In the present embodiment, in which N is 4, the number of dirty bits may be 4 and the number of data sets may be 4. When the dirty bit D0 is "1", it may indicate that the data set DATA0 is dirty, that is, the data set DATA0 and data stored in the memory 120 do not coincide with each other. Furthermore, when the dirty bit D0 is "0", it may indicate that the data set DATA0 and the data stored in the memory 120 coincide with each other. Similarly, the dirty bits D1 to D3 may respectively indicate whether the data sets DATA1 to DATA3 are dirty.

The tag TAG may be information corresponding to 12 bits of 14 bits obtained by excluding the index (i.e., 6 bits) from 20 bits of the address ADD_HOST. When the address ADD_HOST coincides with an index and a tag TAG of a corresponding cache set, it may be cache hit, and otherwise, it may be cache miss. For example, in a case where the index value of 20 bits of the address ADD_HOST is "1" and thus the cache sets CACHE SET4 to CACHE SET7 are accessed, when there is a cache set, in which the value of the tag TAG coincides with 12 bits corresponding to the tag TAG of the address ADD_HOST, among the cache sets CACHE SET4 to CACHE SET7, it may be cache hit.

Each of the N data sets DATA0 to DATA3, that is, each of four data sets DATA0 to DATA3 may include 64 bits of data. A data set to be accessed among the four data sets DATA0 to DATA3 may be decided by 2 bits corresponding to an offset OFFSET of the address ADD_HOST. Since the data chunk size of the memory 120 is 256 bits, when data is updated from the memory 120 to a cache set, data of the four data sets DATA0 to DATA3 may be simultaneously updated.

Table 1 below indicates a correspondence relation between the address ADD_HOST, the offset OFFSET, the index INDEX, and the tag TAG of the host and the address ADD of the memory 120. Table 1, clearly shows the correspondence relation between them.

TABLE 1

| ADD_HOST (20 bits) | | |
|---|---|---|
| TAG (12 bits) | INDEX (6 bits) | OFFSET (2 bits) |
| ADD (18 bits) | | None |

Figure 4:
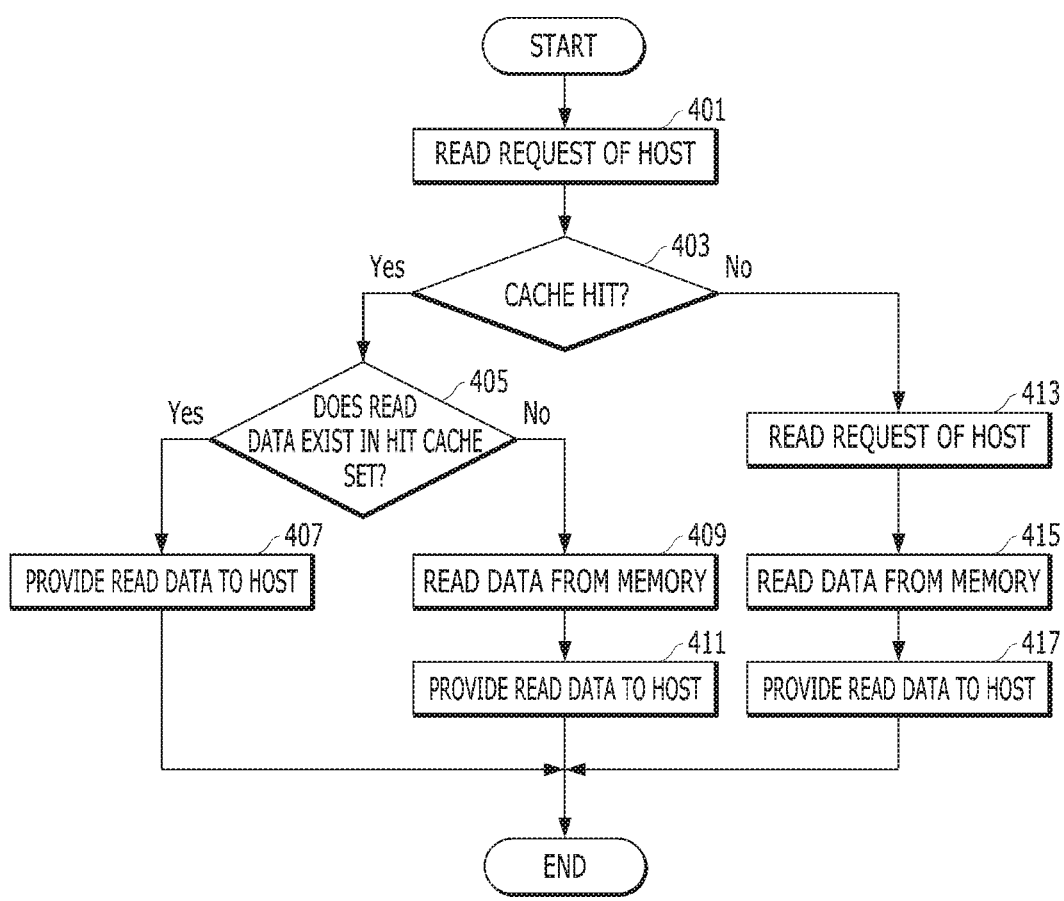
FIG. 4 is a flowchart illustrating a read operation of a memory system in accordance with an embodiment.

FIG. 4 is a flowchart illustrating an example of a read operation of the memory system 100 of FIG. 1.

Referring to FIG. 4, the read operation may be started when the memory controller 110 receives, from the host 1, a request REQ for the read operation and the address ADD_HOST (401).

Next, hit or miss of the cache memory 111 may be checked by the hit/miss check circuit 113 (403). The hit/miss check circuit 113 accesses four cache sets of the cache memory 111 by using 6 bits corresponding to the index INDEX of the address ADD_HOST.

Further, the hit/miss check circuit 113 checks whether there exists a cache set, which stores a tag TAG having substantially the same value as 12 bits corresponding to the tag of the address ADD_HOST, among the accessed four cache sets.

In a case of the cache hit (Yes at 403), the hit/miss check circuit 113 may check whether read data requested by the host 1 exists in a hit cache set (405). When a valid bit (V) of the hit cache set is a logic high level "1", since it indicates that data has been read to the hit cache set from the memory 120, it may be determined that the data requested by the host 1 exists in the hit cache set. When the valid bit (V) of the hit cache set is a logic low level "0", it may be determined that the read data requested by the host 1 exists if a dirty bit corresponding to the offset OFFSET of the address ADD_HOST among the dirty bits D0 to D3 is "1". Further, it may be determined that the read data requested by the host 1 does not exist if the dirty bit corresponding to the offset OFFSET of the address ADD_HOST among the dirty bits D0 to D3 is "0".

When it is determined that the read data requested by the host 1 exists in the hit cache set (Yes at 405), data of a data set corresponding to the read data requested by the host 1 among the data sets DATA0 to DATA3 of the hit cache set may be directly provided to the host (407). In such a case, since the memory 120 is not accessed and read data DATA_HOST is directly provided to the host 1 from the cache memory 111, the read operation requested by the host 1 may be quickly processed.

When it is determined that the read data requested by the host 1 does not exist in the hit cache set (No at 405), the control circuit 117 may read data DATA from the memory 120 and update the hit cache set (409). The control circuit 117 may transfer a read command CMD and an address ADD to the memory 120 and read the data DATA from the memory 120. In such a case, the address ADD may be obtained by converting the address ADD_HOST on the basis of Table 1 above. When data is updated from the memory 120 to the hit cache set, data may be updated in data sets in which the dirty bit is "0" and data may not be updated in data sets in which the dirty bit is "1". This is because data of the data sets, in which the dirty bit is "1", is newer than data read from the memory 120. For example, when the dirty bits D0 to D3 are (1, 1, 0, 0), only 128 bits of data, which corresponds to the data sets DATA2 and DATA3, of the 256-bit data read from the memory 120 may be updated to data sets DATA2 and DATA3.

Then, 64 bits of data DATA_HOST requested by the host 1 among the 256 bits of data read from the memory 120 may be transferred to the host 1 (411).

In a case of the cache miss (No at 403), a new cache set may be occupied (413). The newly occupied cache set may be one of the four cache sets corresponding to the index INDEX of the address ADD_HOST. When an empty cache set, that is, a cache set, in which the valid bit V and the dirty bits D0 to D3 are all "0", does not exist in the four cache sets, an eviction operation for evicting one of the four cache sets may be performed and a cache set becoming empty by the eviction operation may be newly occupied.

Then, the control circuit 117 may read data from the memory and update the newly occupied cache set (415). The control circuit 117 may transfer a read command CMD and an address ADD to the memory 120 and read data DATA from the memory 120. In such a case, the address ADD may be obtained by converting the address ADD_HOST on the basis of Table 1 above. Since the newly occupied cache set is in an empty state, the 256 bits of data read from the memory 120 may be updated to the data sets DATA0 to DATA3.

Then, the 64 bits of data DATA_HOST requested by the host 1 among the 256 bits of data read from the memory 120 may be transferred to the host 1 (417).

Figure 5:
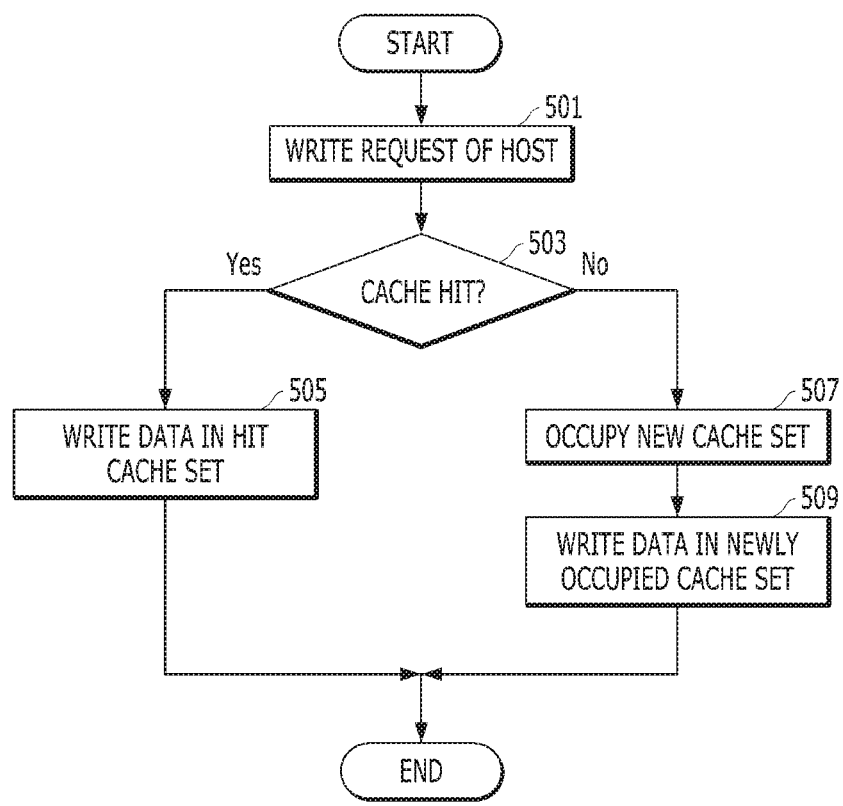
FIG. 5 is a flowchart illustrating a write operation of a memory system in accordance with an embodiment.

FIG. 5 is a flowchart illustrating an example of a write operation of the memory system 100 of FIG. 1.

Referring to FIG. 5, the write operation may be started when the memory controller 110 receives, from the host 1, a request REQ for the write operation, the address ADD_HOST, and the data DATA_HOST (501).

Next, hit or miss of the cache memory 111 may be checked by the hit/miss check circuit 113 (503). The hit/miss check circuit 113 accesses four cache sets of the cache memory 111 by using 6 bits corresponding to the index INDEX of the address ADD_HOST.

Further, the hit/miss check circuit 113 checks whether there exists a cache set, which stores a tag TAG having substantially the same value as 12 bits corresponding to the tag of the address ADD_HOST, among the accessed four cache sets.

In a case of the cache hit (Yes at 503), 64 bits of data DATA_HOST may be written in a data set of a hit cache set, which corresponds to an offset bit of the address ADD_HOST (505). Accordingly, in the hit cache set, a dirty bit, which corresponds to the offset in which the data DATA_HOST has been written, may be activated to a logic high level "1". In such a case, the data DATA_HOST transferred from the host 1 is written in the hit cache set and the write operation is ended, so that the write operation requested by the host 1 may be quickly processed.

In a case of the cache miss (No at 503), a new cache set may be occupied (507). The newly occupied cache set may be one of the four cache sets corresponding to the index INDEX of the address ADD_HOST. When an empty cache set, that is, a cache set, in which the valid bit V and the dirty bits D0 to D3 are all "0", does not exist in the four cache sets, an eviction operation for evicting one of the four cache sets may be performed. Further, a cache set becoming empty by the eviction operation may be newly occupied.

Then, the 64 bits of data DATA_HOST may be written in a data set of the newly occupied cache set, which corresponds to the offset bit of the address ADD_HOST (509). Accordingly, in the newly occupied cache set, the dirty bit, which corresponds to the offset in which the data DATA_HOST has been written, may be activated to "1".

Figures 6, 7:
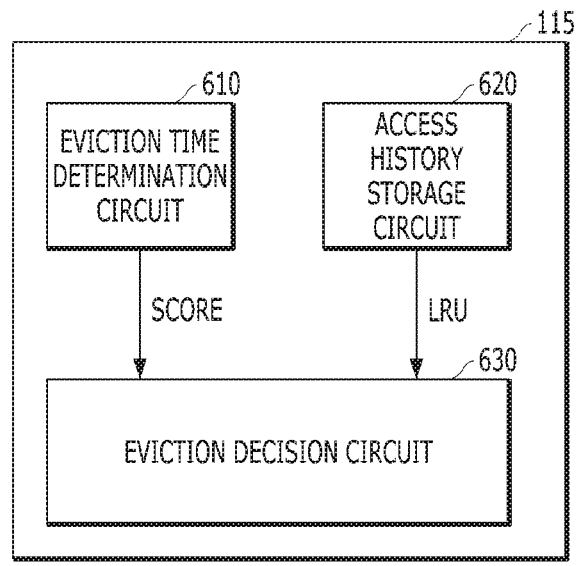
FIG. 6 is a diagram illustrating an eviction circuit in accordance with an embodiment.
FIG. 7 is a diagram illustrating an operation method of an eviction time determination circuit in accordance with an embodiment.

FIG. 6 is a diagram illustrating an exemplary configuration of the eviction circuit 115 of FIG. 1.

Referring to FIG. 6, the eviction circuit 115 may include an eviction time determination circuit 610, an access history storage circuit 620, and an eviction decision circuit 630.

The eviction time determination circuit 610 may give a score on the basis of time required for evicting each cache set of the cache memory 111. For example, a low score may be given to a cache set requiring much time for eviction and a high score may be given to a cache set requiring less time for eviction. The eviction time determination circuit 610 may give a score to each cache set by using the valid bit V and the dirty bits D0 to D3 of each cache set, which will be described in detail with reference to FIG. 7.

The access history storage circuit 620 may store access histories of the cache sets of the cache memory 111. That is, the access history storage circuit 620 may store the cache sets of the cache memory 111 in a recently accessed order.

The eviction decision circuit 630 may decide a cache set to be evicted among the cache sets of the cache memory 111 in consideration of, or based on, the score SCORE decided by the eviction time determination circuit 610 and the access history LRU stored in the access history storage circuit 620.

For example, the eviction decision circuit 630 may evict a cache set having the highest score among the cache sets. When there are a plurality of cache sets having the highest score, the eviction decision circuit 630 may evict a cache set, which has the oldest access time, among the plurality of cache sets. That is, in deciding a cache set to be evicted, the eviction decision circuit 630 may primarily consider the score decided by the eviction time determination circuit 610 and may use a least recently used (LRU) rule among cache sets having substantially the same score.

In various embodiments, the eviction decision circuit 630 evicts a cache set having a higher score decided by the eviction time determination circuit 610. Thus, it is possible to prevent the performance of the memory system 100 from being substantially reduced due to the reduction of time required for the eviction operation.

In the example of FIG. 6, the eviction decision circuit 630 considers the LRU rule as well as the score decided by the eviction time determination circuit 610. In other examples, the access history storage circuit 620 may be omitted and the eviction decision circuit 630 may consider only the score decided by the eviction time determination circuit 610.

FIG. 7 is a diagram illustrating an operating method of an eviction time determination circuit in accordance with an embodiment. For example, the eviction time determination circuit 610 gives a score to cache sets.

In FIG. 7, cache sets are classified into four cases CASE1 to CASE4 according to values of the valid bit V and the dirty bits D0 to D3.

In CASE1, in a corresponding cache set, the valid bit V is a logic high level "1" and the dirty bits D0 to D3 are all logic low levels "0". In such a case, since it indicates that data sets DATA0 to DATA3 stored in the corresponding cache set and the data of the memory 120 completely coincide with each other, both the read and write operations are not required for evicting the corresponding cache set. However, an eviction operation of the corresponding cache set may be completed by changing only the valid bit V to "0". The eviction time determination circuit 610 may give a high score (for example, 2 points) to the cache set of CASE1.

In the CASE2, in a corresponding cache set, the valid bit V is "1" and one or more, but not all, of the dirty bits D0 to D3 are "1". For example, the dirty bits D0 and D2 are "1" and the dirty bits D1 and D3 are "0". In such a case, it may indicate that data of the data sets DATA0 and DATA2 corresponding to the dirty bits D0 and D2 having a value of "1" do not coincide with the data of the memory 120 and data of the data sets DATA1 and DATA3 corresponding to the dirty bits D1 and D3 having a value of "0" coincide with the data of the memory 120. In such a case, in order to evict the corresponding cache set, an operation for writing all the data sets DATA0 to DATA3 in the memory 120 is required. Since the data chunk size of the memory 120 is 256 bits, it is not possible to write only the data sets DATA0 and DATA2 in the memory 120 and the data sets DATA0 to DATA3 should be simultaneously written in the memory 120. The eviction time determination circuit 610 may give an intermediate score (for example, 1 point) to the cache set of CASE2. After the eviction operation is completed, all the valid bit V and the dirty bits D0 to D3 of the corresponding cache set may be changed to "0".

In CASE3, in a corresponding cache set, the valid bit V is "0" and the dirty bits D0 to D3 are all "1". In such a case, since all the data of the data sets DATA0 to DATA3 is dirty, all the data of the data sets DATA0 to DATA3 should be written in the memory 120. That is, in order to evict the corresponding cache set, an operation for writing all the data sets DATA0 to DATA3 in the memory 120 is required. The eviction time determination circuit 610 may give an intermediate score (for example, 1 point) to the cache set of CASE3. After the eviction operation is completed, all the valid bit V and the dirty bits D0 to D3 of the corresponding cache set may be changed to "0".

In CASE4, in a corresponding cache set, the valid bit V is "0" and one of the dirty bits D0 to D3 is "1". For example, the dirty bit D2 is "1" and the dirty bits D0, D1 and D3 are "0". In such a case, the data set DATA2 corresponding to the dirty bit D2 having a value of "1" should be updated to the memory 120. However, it is not possible to recognize values of the data sets DATA0, DATA2, and DATA3 corresponding to the dirty bits D0, D2, and D3 having a value of "0" in the corresponding cache set. Accordingly, in such a case, it is necessary to perform operations for reading data from the memory 120, recognizing correct values of the data sets DATA0, DATA2, and DATA3, and then writing the data sets DATA0, DATA2, and DATA3 in the memory 120. That is, the read operation and the write operation are required for evicting the corresponding cache set. The eviction time determination circuit 610 may give a low score (for example, 0 points) to the cache set of CASE4. After the eviction operation is completed, all the valid bit V and the dirty bits D0 to D3 of the corresponding cache set may be changed to "0".

As a consequence, the eviction time determination circuit 610 may give a high score (for example, 2 points) to the cache set (CASE1) in which time is rarely required because no read and write operations are required for eviction. Also, the eviction time determination circuit 610 may give an intermediate score (for example, 1 point) to the cache sets (CASE2 and CASE3) in which a certain amount of time is required because the write operation is required for eviction. Further, the eviction time determination circuit 610 may give a low score (for example, 0 points) to the cache set (CASE4) in which much time is required because the read and write operations are required for eviction.

FIG. 8 is a flowchart illustrating an example of the eviction operation of the eviction circuit 115.

The eviction operation of the eviction circuit 115 may be performed when there is no empty cache set in the step (413) of occupying a new cache set in the read operation, as shown in FIG. 4, and in the step (507) of occupying a new cache set in the write operation, as shown in FIG. 5.

Referring to FIG. 8, the eviction time determination circuit 610 of the eviction circuit 115 may give a score to cache sets on the basis of time required for eviction of the cache sets (801). As described above, the eviction time determination circuit 610 may give a high score to a cache set in which no read and write operations are required for eviction. Also, the eviction time determination circuit 610 may give an intermediate score to a cache set in which the write operation is required for eviction. Further, the eviction time determination circuit 610 may give a low score to a cache set in which the read and write operations are required for eviction.

Next, the access history storage circuit 620 of the eviction circuit 115 may store access histories of the cache sets (803). That is, the access history storage circuit 620 may store the cache sets in a recently accessed order.

Then, the eviction decision circuit 630 may decide a cache set to be evicted among the cache sets on the basis of the score SCORE and the access history LRU (805). The eviction decision circuit 630 may evict a cache set having a high score. When there are a plurality of cache sets having s high score, the eviction decision circuit 630 may consider access histories.

Then, the eviction decision circuit 630 may evict a cache set decided to be evicted (807). The eviction may be performed by simply changing the valid bit V and the dirty bits D0 to D3 to "0" (CASE1 of FIG. 7). The eviction may be performed by changing the valid bit V and the dirty bits D0 to D3 to "0" after the write operation of the memory 120 is performed under the control of the control circuit 117 (CASE2 and CASE3 of FIG. 7). The eviction may be performed by changing the valid bit V and the dirty bits D0 to D3 to "0" after the read operation and the write operation of the memory 120 are performed under the control of the control circuit 117 (CASE4 of FIG. 7).

Although various embodiments have been illustrated and described, it will be apparent to those skilled in the art in light of the present disclosure that various changes and modifications may be made without departing from the spirit and scope of the invention as defined in the following claims.

What is claimed is:

1. A cache memory for communication between a host and a memory, the cache memory comprising:
   a plurality of cache sets which are classified by a plurality of indexes corresponding to specific bits of an address transferred by the host, each cache set comprising:
   N data sets each including data of a data chunk size identical to a data chunk size of the host;
   one valid bit, wherein the valid bit is activated when data has been updated to any one of the N data sets from the memory, and the valid bit is deactivated when data has not been updated to any one of the N data sets from the memory;
   N dirty bits; and
   a tag,
   wherein a data chunk size of the memory is N times as large as the data chunk size of the host, where N is an integer greater than or equal to 2,
   wherein the N dirty bits respectively indicate whether data of the N data sets is identical to data of the memory,
   wherein a cache set to be accessed has an index value corresponding to the address transferred by the host which is classified into the index, and
   wherein a N data set to be accessed is determined by offset bits of the address transferred by the host.

2. The cache memory of claim 1, wherein
   the tag corresponds to remaining bits of the address transferred by the host.

3. An eviction method of a cache memory for communication between a host and a memory, the eviction method comprising:
   giving a score to each of a plurality of cache sets on the basis of time required for evicting the corresponding cache set; and
   evicting a cache set determined from among the plurality of cache sets based the score given to each of the plurality of cache sets,
   wherein a data chunk size of the memory is N times as large as a data chunk size of the host,
   wherein each of the plurality of cache sets comprises:
   N data sets each including data of a data chunk size identical to a data chunk size of the host;
   one valid bit, wherein the valid bit is activated when data has been updated to any one of the N data sets from the memory, and the valid bit is deactivated when data has not been updated to any one of the N data sets from the memory;

N dirty bits; and a tag, wherein the N dirty bits respectively indicate whether data of the N data sets is identical to data of the memory, wherein the plurality of cache sets are classified by a plurality of indexes corresponding to specific bits of the address transferred by the host, wherein a cache set to be accessed has an index value corresponding to the address transferred by the host which is classified into the index, wherein a N data set to be accessed is determined by offset bits of the address transferred by the host, and wherein the giving of the score comprises giving a high score to a cache set, in which the valid bit is activated and the N dirty bits are deactivated, which does not require a read operation and a write operation for eviction;

giving an intermediate score to a cache set, in which the valid bit is activated and an activated dirty bit exists in the N dirty bits, which requires the write operation, but not the read operation, for an eviction operation;

giving the intermediate score to a cache set, in which the valid bit is deactivated and the N dirty bits are all activated, which requires the write operation, but not the read operation, for the eviction operation; and giving a low score to a cache set, in which the valid bit is deactivated and some of the N dirty bits are activated, which requires the read operation and the write operation for the eviction operation.

4. The eviction method of claim 3, wherein the evicting of the cache set comprises determining the cache set to be evicted based on the score given to each of the plurality of cache sets and a least recently used (LRU) rule.

5. A memory system comprising:

a memory configured to have a data chunk size N times as large as a data chunk size of a host, where N is an integer greater than or equal to 2;

a cache memory configured for communication between the host and the memory and to include a plurality of cache sets which are classified by a plurality of indexes corresponding to specific bits of an address transferred by the host;

a hit/miss check circuit configured to check hit or miss of the cache memory;

an eviction circuit configured to decide a cache set to be evicted among the plurality of cache sets and evict the decided cache set when an eviction operation of the cache memory is required; and an operation control circuit configured to control a read operation and a write operation of the memory, wherein each of the plurality of cache sets comprises:

N data sets each including data of a data chunk size identical to a data chunk size of the host;

one valid bit, wherein the valid bit is activated when data has been updated to any one of the N data sets from the memory, and the valid bit is deactivated when data has not been updated to any one of the N data sets from the memory;

N dirty bits; and a tag, wherein N dirty bits respectively indicate whether data of the N data sets is identical to data of the memory, wherein a cache set to be accessed has an index value corresponding to the address transferred by the host which is classified into the index, and wherein a N data set to be accessed is determined by offset bits of the address transferred by the host.

6. The memory system of claim 5, wherein the eviction circuit comprises:

an eviction time determination circuit configured to give a score to each of the plurality of cache sets on the basis of time required for evicting the corresponding cache set; and an eviction decision circuit configured to decide a cache set to be evicted among the plurality of cache sets based on the scores.

7. The memory system of claim 6, wherein the eviction circuit further comprises:

an access history storage circuit configured to store access histories of the plurality of cache sets, wherein the eviction decision circuit further considers the access histories when deciding the cache set to be evicted.

8. The memory system of claim 6, wherein the eviction time determination circuit gives a high score to a cache set in which a read operation and a write operation are not required for evicting the corresponding cache set of the plurality of cache sets, gives an intermediate score to a cache set in which the write operation, but not the read operation, is required for evicting the corresponding cache set of the plurality of cache sets, and gives a low score to a cache set in which the read and write operations are required for evicting the corresponding cache set of the plurality of cache sets.

9. The memory system of claim 8, wherein the eviction time determination circuit determines that a cache set, in which the valid bit is activated and the N dirty bits are deactivated, does not require a read operation and a write operation for eviction, determines that a cache set, in which the valid bit is activated and an activated dirty bit exists in the N dirty bits, requires the write operation, but not the read operation, for an eviction operation, determines that a cache set, in which the valid bit is deactivated and the N dirty bits are all activated, requires the write operation, but not the read operation, for the eviction operation, and determines that a cache set, in which the valid bit is deactivated and some of the N dirty bits are activated, requires the read operation and the write operation for the eviction operation.

10. The memory system of claim 5, wherein the cache memory, the hit/miss check circuit, the eviction circuit, and the operation control circuit are included in a memory controller of the memory system.

11. The memory system of claim 5, wherein the tag corresponds to remaining bits of the address transferred by the host.

* * * * *